US012525753B2

(12) United States Patent
Bai et al.

(10) Patent No.: US 12,525,753 B2
(45) Date of Patent: Jan. 13, 2026

(54) GROUNDED SHRAPNEL STRUCTURE OF H-MTD MALE CONNECTOR

(71) Applicant: Shenzhen Alex Connector Co Ltd, Shenzhen (CN)

(72) Inventors: Long Bai, Shenzhen (CN); Haiqiu Lu, Shenzhen (CN); Xiaoan Wang, Shenzhen (CN); Qi Peng, Shenzhen (CN)

( * ) Notice: Subject to any disclaimer, the term of this patent is extended or adjusted under 35 U.S.C. 154(b) by 312 days.

(21) Appl. No.: 18/336,716

(22) Filed: Jun. 16, 2023

(65) Prior Publication Data

US 2024/0128692 A1    Apr. 18, 2024

(30) Foreign Application Priority Data

Oct. 17, 2022  (CN) .......................... 202222724483.2

(51) Int. Cl.
*H01R 13/6593*   (2011.01)
*H01R 13/6581*   (2011.01)

(52) U.S. Cl.
CPC ..... *H01R 13/6593* (2013.01); *H01R 13/6581* (2013.01)

(58) Field of Classification Search
CPC ................. H01R 13/6593; H01R 13/6581
USPC ..................................................... 439/607.41
See application file for complete search history.

(56) References Cited

U.S. PATENT DOCUMENTS

| | | | | |
|---|---|---|---|---|
| 4,377,320 A | * | 3/1983 | Lathrop | H01R 24/40 439/585 |
| 5,637,014 A | * | 6/1997 | Sukegawa | H01R 12/00 439/607.4 |
| 5,925,950 A | * | 7/1999 | Lau | H02K 11/225 310/68 B |
| 6,656,002 B2 | * | 12/2003 | Zhao | H01R 13/187 439/787 |
| 7,351,105 B2 | * | 4/2008 | Delaney | H01R 12/707 439/607.36 |
| 7,682,205 B2 | * | 3/2010 | Hall | H01R 27/02 439/752 |
| 8,052,467 B1 | * | 11/2011 | Xie | H01R 13/5219 439/589 |
| 9,667,000 B1 | * | 5/2017 | Morello | H01R 24/38 |
| 9,722,342 B2 | | 8/2017 | Yuan et al. | |

(Continued)

FOREIGN PATENT DOCUMENTS

| | | | | |
|---|---|---|---|---|
| CN | 2487128 Y | * | 4/2002 | |
| CN | 103069653 B | * | 10/2016 | H01R 11/12 |

(Continued)

*Primary Examiner* — Peter G Leigh

(57) ABSTRACT

The utility model relates to a grounded shrapnel structure of an H-MTD male connector, including a housing of a hollow structure, a shrapnel in an arch shape, and a guide block. The front end of the housing is provided with an opening. The guide block is arranged horizontally. One end of the guide block is connected to one end of the opening. The other end of the guide block is connected to one end of the shrapnel. The structure uses only two surfaces at top and bottom that are grounded, thereby reducing the number of openings, improving the strength of a sidewall, and enhancing the shielding effect. In addition, the guide block can play the function of anti-scratching during assembly, which can effectively avoid the damage to the shrapnel during assembly and improve yield.

9 Claims, 2 Drawing Sheets

(56) References Cited

U.S. PATENT DOCUMENTS

| | | | |
|---|---|---|---|
| 10,008,796 B1 | 6/2018 | Wang et al. | |
| 10,224,659 B2 * | 3/2019 | Pemwieser | H01R 4/48 |
| 10,446,951 B2 * | 10/2019 | Miedl | H01R 43/05 |
| 10,944,218 B2 * | 3/2021 | Lödding | H01R 13/6581 |
| 11,245,232 B2 | 2/2022 | Oosaka | |
| 11,557,847 B2 * | 1/2023 | Zebhauser | H01R 13/6456 |
| 2005/0124217 A1 | 6/2005 | Zhuang | |
| 2014/0187105 A1 * | 7/2014 | Zhao | H01R 12/707 |
| | | | 29/874 |
| 2018/0366856 A1 | 12/2018 | Pemwieser et al. | |
| 2019/0288458 A1 | 9/2019 | Lödding | |
| 2021/0234304 A1 * | 7/2021 | Zebhauser | H01R 27/02 |
| 2021/0344125 A1 * | 11/2021 | Miedl | H01R 43/048 |
| 2021/0399512 A1 * | 12/2021 | Miedl | H01B 13/0003 |
| 2022/0013973 A1 * | 1/2022 | Zebhauser | H01R 24/40 |

FOREIGN PATENT DOCUMENTS

| | | | | |
|---|---|---|---|---|
| DE | 102006006845 B3 * | 7/2007 | | H01R 13/631 |
| DE | 102009030463 A1 * | 12/2010 | | H01R 13/18 |
| EP | 3396791 A1 * | 10/2018 | | H01R 13/18 |
| EP | 3660986 A1 * | 6/2020 | | H01R 43/20 |
| WO | WO-2021151869 A1 * | 8/2021 | | H01R 43/28 |

\* cited by examiner

GROUNDED SHRAPNEL STRUCTURE OF H-MTD MALE CONNECTOR

TECHNICAL FIELD

The utility model relates to the field of a connector, and in particular, to a grounded shrapnel structure of an H-MTD male connector.

TECHNICAL BACKGROUND

A grounded shrapnel is arranged at the head of an H-MTD male connector in the prior art. Because the grounded shrapnel is arch-shaped, there is a risk that the head of the connector will be knocked over in an assembly process. Repeated assembly may cause damage to the grounded shrapnel. An outer iron housing of the male connector is a shrapnel structure, of which the periphery is opened, which has poor shielding effect.

SUMMARY

The utility model provides a grounded shrapnel structure of an H-MTD male connector, which aims to solve the problem that a grounded shrapnel of a male connector in the prior art is easily damaged.

The utility model provides a grounded shrapnel structure of an H-MTD male connector, including a housing of a hollow structure, a shrapnel in an arch shape, and a guide block. The front end of the housing is provided with an opening. The guide block is arranged horizontally. One end of the guide block is connected to one end of the opening. The other end of the guide block is connected to one end of the shrapnel.

As a further improvement of the utility model, the housing includes a first connecting block, a second connecting block, and a third connecting block. One end of the first connecting block is connected to one end of the second connecting block. One end of the third connecting block is connected to the other end of the second connecting block.

As a further improvement of this utility model, the first connecting block has a caliber larger than that of the second connecting block. The second connecting block has a caliber larger than that of the third connecting block.

As a further improvement of the utility model, the middles of the first connecting block, the second connecting block, and the third connecting block are intercommunicated.

As a further improvement of the utility model, the openings are provided at the top and the bottom of the second connecting block and arranged close to the third connecting block. The shrapnel is arranged away from the third connecting block.

As a further improvement of the utility model, the middle of the top of the housing is provided with a splitting groove. The housing is divided into a first housing and a second housing along the splitting groove.

As a further improvement of the utility model, the tail of the first housing is provided with a first dovetail interface. The tail of the second housing is provided with a second dovetail interface. The first dovetail interface and the second dovetail interface are plugged into each other.

As a further improvement of the utility model, at least four guide blocks are provided. At least four pieces of shrapnel are provided.

As a further improvement of the utility model, the housing, the guide block and the shrapnel are an integrally molded structure.

The utility model has the following beneficial effect: the structure uses only two surfaces at top and bottom that are grounded, thereby reducing the number of openings, improving the strength of a sidewall, and enhancing the shielding effect. In addition, the guide block can play the function of anti-scratching during assembly, which can effectively avoid the damage to the shrapnel during assembly and improve yield.

Figure 1:
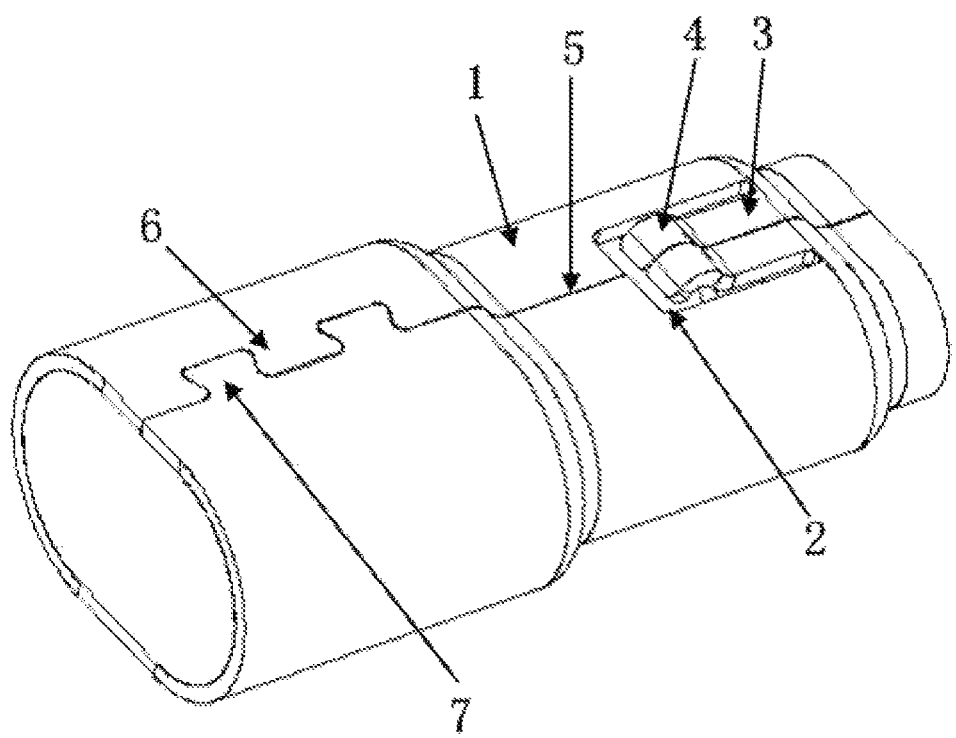
FIG. 1 is a schematic diagram of the top of the utility model.

Reference signs: 1—housing, 11—first connecting block, 12—second connecting block, 13—third connecting block, 2—opening, 3—guide block, 4—shrapnel, 5—splitting groove, 6—first dovetail interface, 7—second dovetail interface.

DETAILED DESCRIPTION OF EMBODIMENTS

To make the objectives, technical solutions, and advantages of the utility model clearer, the utility model will be further described in detail hereinafter in combination with the drawings and embodiments. It should be noted that the words "front", "back", "left", "right", "top", and "bottom" used in the following description refer to the directions in the drawings, while the words "bottom" and "top", "inside" and "outside" refer to the directions toward or away from the geometric center of a particular part, respectively.

Figure 2:
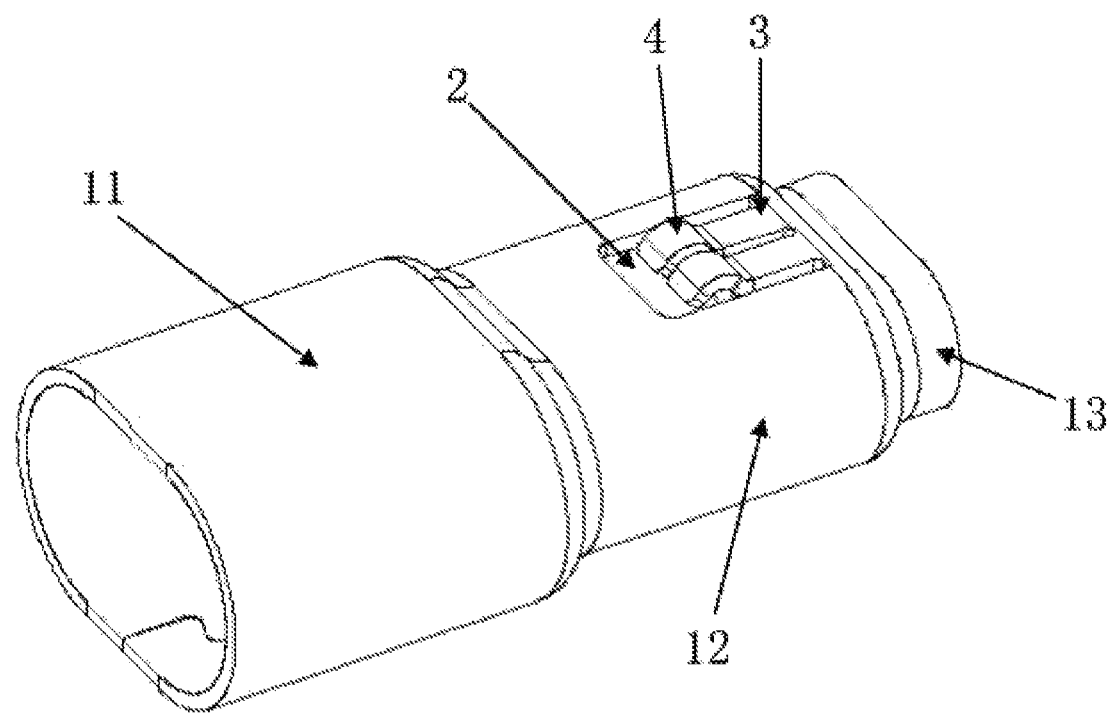
FIG. 2 is a schematic diagram of the bottom of the utility model.

As shown in FIGS. 1-2, the utility model provides a grounded shrapnel structure of an H-MTD male connector, including a housing 1 of a hollow structure, a shrapnel 4 in an arch shape, and a guide block 3. The front end of the housing 1 is provided with an opening 2. The guide block 3 is arranged horizontally. One end of the guide block 3 is connected to one end of the opening 2. The other end of the guide block 3 is connected to one end of the shrapnel 4.

As an embodiment of the utility model, the housing 1 includes a first connecting block 11, a second connecting block 12, and a third connecting block 13. One end of the first connecting block 11 is connected to one end of the second connecting block 12. One end of the third connecting block 13 is connected to the other end of the second connecting block 12.

As another embodiment of this utility model, the first connecting block 11 has a caliber larger than that of the second connecting block 12. The second connecting block 12 has a caliber larger than that of the third connecting block 13.

As another embodiment of the utility model, the middles of the first connecting block 11, the second connecting block 12 and the third connecting block 13 are intercommunicated.

As another embodiment of the utility model, the openings 2 are provided at the top and the bottom of the second connecting block 12 and arranged close to the third connecting block 13. The shrapnel 4 is arranged away from the third connecting block 13.

As another embodiment of the utility model, the middle of the top of the housing 1 is provided with a splitting groove 5. The housing 1 is divided into a first housing 1 and a second housing 1 along the splitting groove 5.

As another embodiment of the utility model, the tail of the first housing 1 is provided with a first dovetail interface 6. The tail of the second housing 1 is provided with a second dovetail interface 7. The first dovetail interface 6 and the second dovetail interface 7 are plugged into each other.

As another embodiment of the utility model, at least four guide blocks 3 are provided. At least four pieces of shrapnel 4 are provided.

As another embodiment of the utility model, the housing 1, the guide block 3, and the shrapnel 4 are an integrally molded structure.

The utility model provides a grounded shrapnel structure of an H-MTD male connector. The structure uses only the two surfaces at top and bottom that are grounded, thereby reducing the number of openings, improving the strength of a sidewall, and enhancing the shielding effect. In addition, the guide block 3 can play the function of anti-scratching during assembly, which can effectively avoid the damage to the shrapnel 4 during assembly, and improve yield.

When being assembled, the male connector is connected to a female connector in the direction of the third connecting block 13. Finally, the female connector is snapped onto the second connecting block 12. Compared to the male connector in the prior art, the shrapnel 4 is arranged in a reverse direction, away from the third connecting block 13, and connected in an opening 2 on the housing 1 using the guide block 3. The guide block 3 is arranged horizontally. Therefore, the female connector can avoid from being assembled in a wrong position and from hitting the shrapnel 4 during assembly, which can prevent the shrapnel 4 from directly colliding with the edge of the female connector, providing an anti-scratching effect. In this structure, the shrapnel 4 is only arranged in the top and the bottom of the housing 1. The two sides of the housing are not provided with the shrapnel 4, to avoid the situation that the strength of an overall product becomes weak after the periphery of the housing is opened. The structure in which the two pieces of shrapnel 4 are provided at the top and the bottom of the structure has a big strength. In addition, the height of the structure can be adjusted to make up the strength. The shrapnel 4 and the guide block 3 are provided in pairs. The two pieces of shrapnel 4 and the guide block 3 are provided at the top of the housing 1. The two pieces of shrapnel 4 and the guide block 3 are provided at the bottom of the housing 1. The two sets of the shrapnel 4 at the top and bottom after assembly can function as grounding, thus achieving a force balance.

The housing 1 is a hollow structure. A connecting wire can be provided inside the housing 1. The first connecting block 11 has a caliber larger than that of the second connecting block 12. The second connecting block 12 has a caliber larger than that of the third connecting block 13. The overall structure is stepped-shaped to ensure the connecting function of the connector. The middle of the top of the housing 1 is also provided with the splitting groove 5. Along the splitting groove 5, the housing 1 can be divided into the first housing 1 and the second housing 1 on the left and right sides. The tail of the first housing 1 is provided with the first dovetail interface 6. The tail of the second housing 1 is provided with the second dovetail interface 7. The first dovetail interface 6 and the second dovetail interface 7 are plugged into each other. The first dovetail interface 6 and the second dovetail interface 7 are both provided on the first connecting block 11. With such design, the housing 1 can be opened for easy assembly in a certain specific connecting environment.

The above content is a further detailed description of the utility model in conjunction with specific preferred embodiments, and it cannot be considered that the specific implementation of the utility model is limited to these descriptions. For those skilled in the art to which the utility model pertains, without departing from the concept of the utility model, a plurality of simple deductions or substitutions can be made, which should be regarded as belonging to the protection scope of the utility model.

The invention claimed is:

1. A grounded shrapnel structure of an H-MTD male connector, comprising
   a housing of a hollow structure,
   a shrapnel in an arch shape, and
   a guide block,
   wherein a front end of the housing is provided with openings each having a first end and a second end opposite to the first end, the first end and the second end are arranged along an axial direction of the housing, the guide block is arranged horizontally, one end of the guide block is connected to the first end of the opening, an other end of the guide block is connected to one end of the shrapnel, an other end of the shrapnel is a free end facing the second end;
   a middle of a top of the housing is provided with a splitting groove, the housing is divided into a first housing and a second housing along the splitting groove, a tail of the first housing is provided with a first dovetail interface, a tail of the second housing is provided with a second dovetail interface, and the first dovetail interface and the second dovetail interface are plugged into each other.

2. The grounded shrapnel structure of the H-MTD male connector according to claim 1, wherein the housing comprises a first connecting block, a second connecting block, and a third connecting block, one end of the first connecting block is connected to a proximal end of the second connecting block, and one end of the third connecting block is connected to a distal end of the second connecting block.

3. The grounded shrapnel structure of the H-MTD male connector according to claim 2, wherein the first connecting block has a caliber larger than that of the second connecting block, and the second connecting block has a caliber larger than that of the third connecting block.

4. The grounded shrapnel structure of the H-MTD male connector according to claim 3, wherein middles of the first connecting block, the second connecting block, and third connecting block are intercommunicated.

5. The grounded shrapnel structure of the H-MTD male connector according to claim 4, wherein the openings are provided at a top and a bottom of the second connecting block and are provided close to the third connecting block, and the shrapnel is provided away from the third connecting block.

6. The grounded shrapnel structure of the H-MTD male connector according to claim 2, wherein the first end is positioned at the distal end of the second connecting block adjacent to the third connecting block, and the second end is positioned away from the third connecting block.

7. The grounded shrapnel structure of the H-MTD male connector according to claim 2, wherein the openings are only provided at a top and a bottom of the second connecting block, two sides of the second connecting block are not provided with the openings and the shrapnel.

8. The grounded shrapnel structure of the H-MTD male connector according to claim 1, wherein at least four guide blocks are provided, and at least four pieces of shrapnel are provided.

9. The grounded shrapnel structure of the H-MTD male connector according to claim 1, wherein the housing, the guide block, and the shrapnel are an integrally molded structure.

* * * * *